US011210155B1

(12) United States Patent
Cao et al.

(10) Patent No.: US 11,210,155 B1
(45) Date of Patent: Dec. 28, 2021

(54) PERFORMANCE DATA ANALYSIS TO REDUCE FALSE ALERTS IN A HYBRID CLOUD ENVIRONMENT

(71) Applicant: International Business Machines Corporation, Armonk, NY (US)

(72) Inventors: Li Cao, Beijing (CN); Xing Xing Shen, Beijing (CN); Zhi Li, Haidian (CN); Bo Tong Liu, Beijing (CN); He Jiang Jia, Changping District (CN); Xiao Dong Li, Beijing (CN); Sheng Jie BJ Han, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/342,714

(22) Filed: Jun. 9, 2021

(51) Int. Cl.
*G06F 11/32* (2006.01)
*G06F 11/07* (2006.01)
(Continued)

(52) U.S. Cl.
CPC ...... *G06F 11/0772* (2013.01); *G06F 11/0781* (2013.01); *G06F 11/3006* (2013.01); *G06F 11/327* (2013.01); *G06F 11/3409* (2013.01)

(58) Field of Classification Search
CPC ............. G06F 11/0772; G06F 11/0781; G06F 11/3006; G06F 11/327; G06F 11/3409
See application file for complete search history.

(56) References Cited

U.S. PATENT DOCUMENTS

| 5,406,502 A | * | 4/1995 | Haramaty | G05B 19/4063 702/183 |
| 6,073,089 A | * | 6/2000 | Baker | G06F 11/0709 702/185 |

(Continued)

FOREIGN PATENT DOCUMENTS

CN          112153044 A         12/2020

OTHER PUBLICATIONS

Ibidunmoye, O., Francisco, H-R., Elmroth, E., "Performance Anomaly Detection and Bottleneck Identification", Jun. 2015, ACM Computing Surveys, vol. 48, Issue 1, pp. 1-37 (Year: 2015).*

(Continued)

*Primary Examiner* — Matthew M Kim
*Assistant Examiner* — Indranil Chowdhury
(74) *Attorney, Agent, or Firm* — Cantor Colburn LLP; Teddi Maranzano

(57) ABSTRACT

Aspects of the invention include a computer-implemented method that includes converting runtime data points that are indicative of an influence of the runtime data points on a robustness and performance of a computing system. The runtime data points are clustered, wherein each cluster respectively represents a temporal state of the computing system. Each cluster is translated into a three-dimensional representation based on a probability density of the runtime data points of each cluster. A time-based vector is generated, where the vector describes a transition from a first three-dimensional representation to a second three-dimensional representation. Each three-dimensional representation traversed by the time-based vector represents a respective state of the computing system. The time-based vector is compared with a baseline vector. An anomaly alert is issued based at least in part on the comparison.

20 Claims, 8 Drawing Sheets

(51) Int. Cl.
*G06F 11/30* (2006.01)
*G06F 11/34* (2006.01)

(56) References Cited

U.S. PATENT DOCUMENTS

| | | | |
|---|---|---|---|
| 6,408,259 B1 | 6/2002 | Goebel et al. | |
| 7,243,048 B2* | 7/2007 | Foslien | G05B 23/024 701/99 |
| 7,254,491 B2* | 8/2007 | Mylaraswamy | F01D 17/085 701/99 |
| 7,280,941 B2* | 10/2007 | Bonanni | G05B 23/0254 700/30 |
| 10,210,036 B2* | 2/2019 | Iyer | G06F 11/0751 |
| 10,261,851 B2* | 4/2019 | Velipasaoglu | H04L 41/16 |
| 10,496,466 B2* | 12/2019 | Zhao | G06F 17/175 |
| 10,623,236 B2* | 4/2020 | Sadaphal | H04L 41/064 |
| 2017/0262818 A1* | 9/2017 | Horrell | G06Q 10/0635 |
| 2019/0102276 A1* | 4/2019 | Dang | H04L 67/1097 |
| 2020/0267057 A1* | 8/2020 | Garvey | H04L 41/0816 |
| 2020/0341833 A1* | 10/2020 | Poghosyan | G06F 11/3058 |
| 2021/0065976 A1* | 3/2021 | Shen | H01F 41/048 |

OTHER PUBLICATIONS

Dalmazo et al., "A Prediction-based Approach for Anomaly Detection in the Cloud," SBRC, (2019): 8 pages.

X. Xu et al., "Crying Wolf and Meaning It: Reducing False Alarms in Monitoring of Sporadic Operations through POD-Monitor," 2015 IEEE/ACM 1st International Workshop on Complex Faults and Failures in Large Software Systems (COUFLESS), (2015): pp. 69-75.

Soft Computing and Intelligent Information Systems, "Noisy Data in Data Mining," https://sci2s.ugr.es/noisydata (Retrieved Mar. 3, 2021), 43 pages.

* cited by examiner

PERFORMANCE DATA ANALYSIS TO REDUCE FALSE ALERTS IN A HYBRID CLOUD ENVIRONMENT

BACKGROUND

The present invention generally relates to programmable computing systems, and more specifically, to programmable computing systems configured for performing a performance data analysis to reduce false alerts in a hybrid cloud environment.

Data science is an interdisciplinary field, in which computing systems use complex algorithms for the analysis of large amounts of unstructured data and the generation of insights from the analysis. Data scientists draw upon their business acumen, mathematics, computer science knowledge, and communication skills to generate these algorithms and interpret various computing outputs. One aspect of data science is anomaly detection, which is a process in which computing systems identify data points and data trends that differ from the norm. Anomalous data can be utilized to identify exceptions or as indicators of a change in computing model behavior, for example, in a hybrid cloud computing environment.

A hybrid cloud computing environment is one in which data is shared and processed between a centralized data center (private cloud computing environment) and third-party applications operating one or more public cloud computing environments. System administrators use data, such as throughput, queue length, and response time, to measure the performance of the hybrid cloud computing environment. The system data is unpredictable, complex, and the system administrators must set numerous performance indicator thresholds to monitor for anomalies and measure the performance of the applications of the overall cloud computing environment. The administrators generally perform static anomaly detection by setting static thresholds as triggers for anomaly alerts. However, if a threshold is set too low, then an anomaly detection system can be triggered to issue a false alert. On the other hand, if a threshold is set too high, then the anomaly detection system can fail to issue an alert.

SUMMARY

Embodiments of the present invention are directed to a computer-implemented method for performance analysis to reduce false alerts in a hybrid cloud environment. A non-limiting example of the computer-implemented method includes converting runtime data points that are indicative of an influence of the runtime data points on a robustness and performance of a computing system. The runtime data points are clustered, wherein each cluster respectively represents a temporal state of the computing system. Each cluster is translated into a three-dimensional representation based on a probability density of the runtime data points of each cluster. A time-based vector is generated, where the vector describes a transition from a first three-dimensional representation to a second three-dimensional representation. Each three-dimensional representation traversed by the time-based vector represents a respective state of the computing system. The time-based vector is compared with a baseline vector. An anomaly alert is issued based at least in part on the comparison.

Embodiments of the present invention further include determining whether the deviation of the time-based vector from the baseline vector is due to a false positive of an anomaly by determining whether a starting data point and an ending data point of a first leg of the time-based vector are respectively included in a first cluster and a temporally sequential second cluster. A trajectory of the first leg of the time-based vector is then compared to a trajectory of the first leg of the baseline vector to determine whether the trajectories deviate greater than a threshold deviation.

Embodiments of the present invention even further include determining whether the deviation of the time-based vector from the baseline vector is due to a false negative of the anomaly by comparing a sequence of state transitions described by the time-based vector with a sequence of state transitions described by the baseline vector.

Embodiments of the present invention provide technical solutions described herein, accordingly address the technical challenges of using static thresholds for anomaly detection. Hybrid cloud systems and artificial intelligence for IT operations (AIOps) include large amounts of unpredictable and complex data. System Administrators must set numerous performance indicators to monitor the data to assess an application's or system's status. The technical solutions described herein, thus, provide a practical application of generating three-dimensional representations that describe a temporal state of an application or system. Further, the technical solutions described here improve related anomaly detection systems and other technical solutions that generate anomaly indicators by continuously monitoring a real-time trajectory from one temporal state to a next temporal state of the application or system rather than relying on static performance indicator thresholds.

Embodiments of the present invention are directed to a system for performance analysis to reduce false alerts in a hybrid cloud environment. A non-limiting example of the system includes converting runtime data points that are indicative of an influence of the runtime data points on a robustness and performance of a computing system. The system clusters the runtime data points, where each cluster respectively represents a temporal state of the computing system. The system translates each cluster into a three-dimensional representation based on a probability density of the runtime data points of each cluster. The system generates a time-based vector, where the vector describes a transition from a first three-dimensional representation to a second three-dimensional representation. Each three-dimensional representation traversed by the time-based vector represents a respective state of the computing system. The system compares the time-based vector with a baseline vector. The system issues an anomaly alert based at least in part on the comparison.

Embodiments of the present invention are directed to a computer program product for performance analysis to reduce false alerts in a hybrid cloud environment. A non-limiting example of the computer program product includes converting runtime data points that are indicative of an influence of the runtime data points on a robustness and performance of a computing system. The computer program product causes the runtime data points to be clustered, where each cluster respectively represents a temporal state of the computing system. The computer program product causes each cluster to be translated into a three-dimensional representation based on a probability density of the runtime data points of each cluster. The computer program product causes a time-based vector to be generated, where the vector describes a transition from a first three-dimensional representation to a second three-dimensional representation. Each three-dimensional representation traversed by the time-based vector represents a respective state of the computing system. The computer program product causes the time-based vector to be compared with a baseline vector. The computer program product causes an anomaly alert to be issued based at least in part on the comparison.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods, computing systems, and computer program products for anomaly detection based on a comparison between real-time performance and robustness patterns of a computing system and baseline patterns for the computing system.

One or more embodiments of the present invention address one or more of the above-described shortcomings by providing computer-implemented methods, computing systems, and computer program products for anomaly detection that collect system data and generate clusters of performance/robustness data points. Each cluster represents a state of a hybrid cloud computing environment at some point in time. The different clusters of data points are mapped to a two-dimensional coordinate system. The clustered two-dimensional performance/robustness values are translated into a three-dimensional representation. A vector that describes a time-based trajectory of the transition from one state to a next temporally sequential state is generated. The generated time-based vector is compared to a baseline vector to determine whether to issue an anomaly alert.

Figure 1:
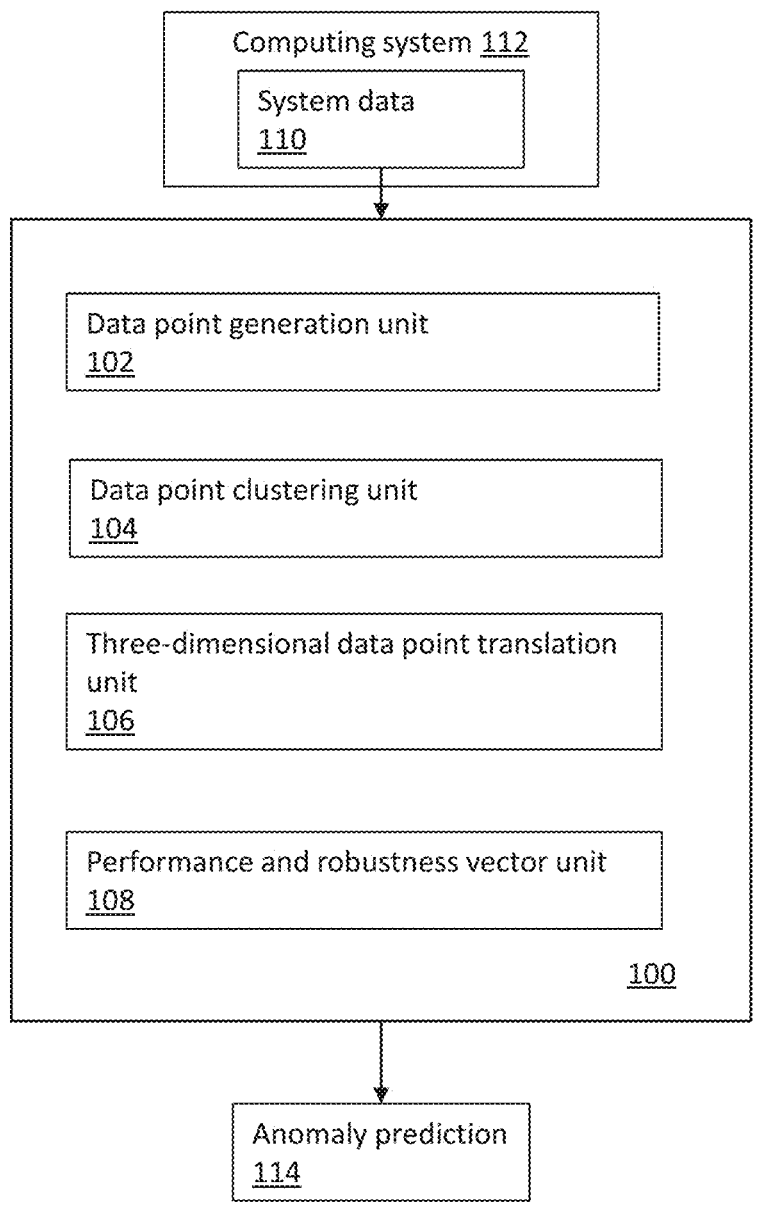
FIG. 1 illustrates a system for performance analysis to reduce false alerts in a hybrid cloud environment according to one or more embodiments of the present invention.

Referring to FIG. 1, a system 100 for anomaly detection is shown in accordance with embodiments of the present invention. The system 100 includes a data point generation unit 102 for collecting system data 110 from a computing system 112 for analyzing and calculating performance/robustness data points from the data. The system 100 further includes a data point clustering unit 104 for translating the performance/robustness data points into a two-dimensional coordinate system, clustering the data points, and calculating the dimensions of the different clusters. The system 100 further includes a three-dimensional data point translation unit 106 for translating the clusters into three-dimensional representations based on a gradient and probability density of the data points. The system 100 further includes a performance and robustness vector unit 108 for calculating a vector that describes a time-based path across the three-dimensional representations and compares the calculated vectors with baseline vectors. Based on the comparison, the performance and robustness vector unit 108 makes a prediction 114 as to whether the system data is indicative of an anomaly. It should be appreciated that a portion or all of the functionality of the system 100 can be performed on the cloud computing environment 50 as described in FIG. 6 and a processing system 800 as described by FIG. 8.

In accordance with one or more embodiments of the present invention, the data point generation unit 102 is operable to receive system data 110 in the form of real-time runtime data from a computing system 112 as inputs and determine the data's influence on the performance and robustness of the computing system 112. The system data 110 can include computer hardware and software-related data related, but not limited, to CPU performance values, memory performance values, input/output (IO) performance values, and network performance values. In a hybrid cloud computing environment, the system data 110 may be collected from any connected private cloud, public cloud, and edge device. The system data 110 is further collected from multiple perspectives, such as the server side (response time for a private cloud for a request from a public cloud) and an edge device side (resource load time).

In accordance with one or more embodiments of the present invention, the data point generation unit 102 is implemented as a neural network, for example, that executes a pre-trained model to generate a value representing the degree that the data points of the system data 110 contribute to the robustness and performance of the computing system 112. The neural network samples the system data 110 via an input layer, extracts features via hidden layers, and outputs robustness and performance values for the sampled data points. In effect, the data point generation unit 102 generates performance/robustness data points from the system data 110. Robustness is the insensitivity of the computing system's hardware and software to errors that occur during the computing system's operation. Performance is a measure of the work performed by the computing system 112. The data point generation unit 102 can be organized as a radial basis function (RBF) network, which is designed for time series data-based prediction. An RBF network is a feedforward network the includes a input layer, a hidden layer, and an output layer. An RBF network is distinguishable from other neural networks based on its universal approximation functionality and training speed. The RBF network uses RBF functions as activation functions that operate on the notion that the predicted value target value of an item is similar to other items of the predictor variables (e.g., performance value and robustness value). The RBF network generates values within a range of values for how low or how high of an influence each system data point has on both performance and robustness. For example, one system data point may have a low influence on performance, but a high influence on robustness. On the other hand, another system data point may have a high influence on performance, but a low influence on robustness. By assigning the performance and robustness values to the system data points, the data point generation unit 102 generates the performance/robustness data points.

The data point clustering unit 104 receives the robustness/performance data points from the data point generation unit 102 and maps the points to a two-dimensional coordinate system, (e.g., Cartesian coordinate system), in accordance with one or more embodiments of the present invention. For example, the data point clustering unit 104 can map the robustness/performance data points to a two-dimensional grid, in which the x-axis represents a range of values from low to high for the influence of the system data points on robustness, and the y-axis represents a range of values from low to high for the influence of the system data points on performance.

Once the robustness/performance data points have been mapped to the two-dimensional coordinate system, the data point clustering unit 104 clusters the robustness/performance data points into groups of data points. For example, the data point clustering unit 104 can use a mean-shift model (mode-seeking algorithm) in which each data point is iteratively assigned towards the closest cluster centroid and in the direction of the closest cluster of robustness/performance data points. After each iteration, the data point clustering unit 104 moves each data point closer to a cluster center. After a number of iterations, the data point clustering unit 104 ceases moving the data points, and the data points are assigned to clusters. Each cluster is considered a state of the computing system 112, such that each cluster is a characterization of the computing system 112 at a point in time. Upon determining each cluster, the data point clustering unit 104 can characterize the aspects of the computing system 112 for each state. For example, for an overall computing system 112, if a cluster exhibits high performance and low robustness, the computing system 112 can be characterized as high concurrency. If, however, the cluster is characterized as low performance and medium robustness, the computing system 112 can be characterized by CPU competition. Certain data points that remain a predetermined distance too far from a centroid cluster are considered outliers and not assigned to any cluster. The data point clustering unit 104 can also use various other clustering algorithms, such as connectivity clustering models, density clustering models, centroid clustering models, and distribution clustering models.

The three-dimensional data point translation unit 106 converts the two-dimensional representation of the data points into a three-dimensional representation. The three-dimensional data point translation unit 106 begins by calculating the "center of mass" of each state. In some embodiments of the present invention, the three-dimensional data point translation unit 106 uses the following relationship:

$$\text{Center}(P_{c(sk)}, R_{c(sk)}) = \frac{\sum_{i=1}^{m} \text{point}(p_i, r_i)}{n_k}, \quad (1)$$

where, $P_{c(sk)}$ is a point along a performance axis, $R_{c(sk)}$) is a point along the robustness axis (collectively the coordinates of the center of mass), $n_k$ is the number of points of the state k, m is the total number of states, $p_i$ is a point along a performance axis for a data point of the cluster, $r_i$ is a point along a performance axis for a data point of the cluster, and Center is the center of mass. The three-dimensional data point translation unit 106 then calculates the probability of each state using the below relationship.

$$Pro(S_k) = \frac{n_k}{\sum_{i=1}^{m} n_i}, \quad (2)$$

in which a sum of the probabilities of all the states is equal to one.

The three-dimensional data point translation unit 106 then calculates the probability density of each state using the below relationships:

$$f_k(p, r) = h_k \exp\left[-\frac{1}{2}((p - p_{c(sk)})^2 + (r - R_{c(sk)})^2)\right], \quad (3)$$

$$\iint_D f_k(p,r) dp\, dr = Pro(sk), \quad (4)$$

where $h_k$ indicates the largest probability density of state k and D represents the area of state k.

The three-dimensional data point translation unit 106 translates the two-dimensional clusters (states) into three-dimensional representations, in which a local height of a cluster is defined by its local probability density. Visually, the structures would resemble mountainous regions in which the peaks are defined as regions of high probability density and valleys are defined as areas of low probability densities.

The performance and robustness vector unit 108 then calculates time-based three-dimensional vectors that track a trajectory of a progression of the states of the computing system 112. For example, the time-based vector can describe the computing system 112 transitioning from a high concurrency state to a resource competition state. The performance and robustness vector unit 108 then compares any deviation from a trajectory of the generated time-based vector to a trajectory of the baseline vector to determine whether an error alert should be issued.

The system 100 provides more accurate anomaly alerts than related anomaly detection systems. Related anomaly detection systems focus on single points in time of a computing system, whereas the herein described system 100 looks towards a transition in the states of the computing system 112. The three-dimensional trajectories can not only describe a transition from one state to a next state, but the three-dimensional component of the system 100 permits it to analyze a local concentration of runtime data points through the elevation of the three-dimensional structures.

The phrases "neural network" and "machine learning" broadly describes a function of electronic systems that learn from data. A machine learning system, engine, or module can include a machine learning algorithm that can be trained, such as in an external cloud environment (e.g., the cloud computing environment 50), to learn functional relations between inputs and outputs that are currently unknown. In one or more embodiments, machine learning functionality can be implemented using a data point generation unit 102 and a performance and robustness vector unit 108, having the capability to be trained to perform a currently unknown function. In machine learning and cognitive science, neural networks are a family of statistical learning models inspired by the biological neural networks of animals, and in particular, the brain. Neural networks can be used to estimate or approximate systems and functions that depend on a large number of inputs.

The data point generation unit 102 and a performance and robustness vector unit 108 can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in the data point generation unit 102 and a performance and robustness vector unit 108 that carry electronic messages between simulated neurons are provided with numeric weights that correspond to the strength or weakness of a given connection. During training, The weights can be adjusted and tuned based on experience, making the data point generation unit 102 and a performance and robustness vector unit 108 adaptive to inputs and capable of learning. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

Figure 2:
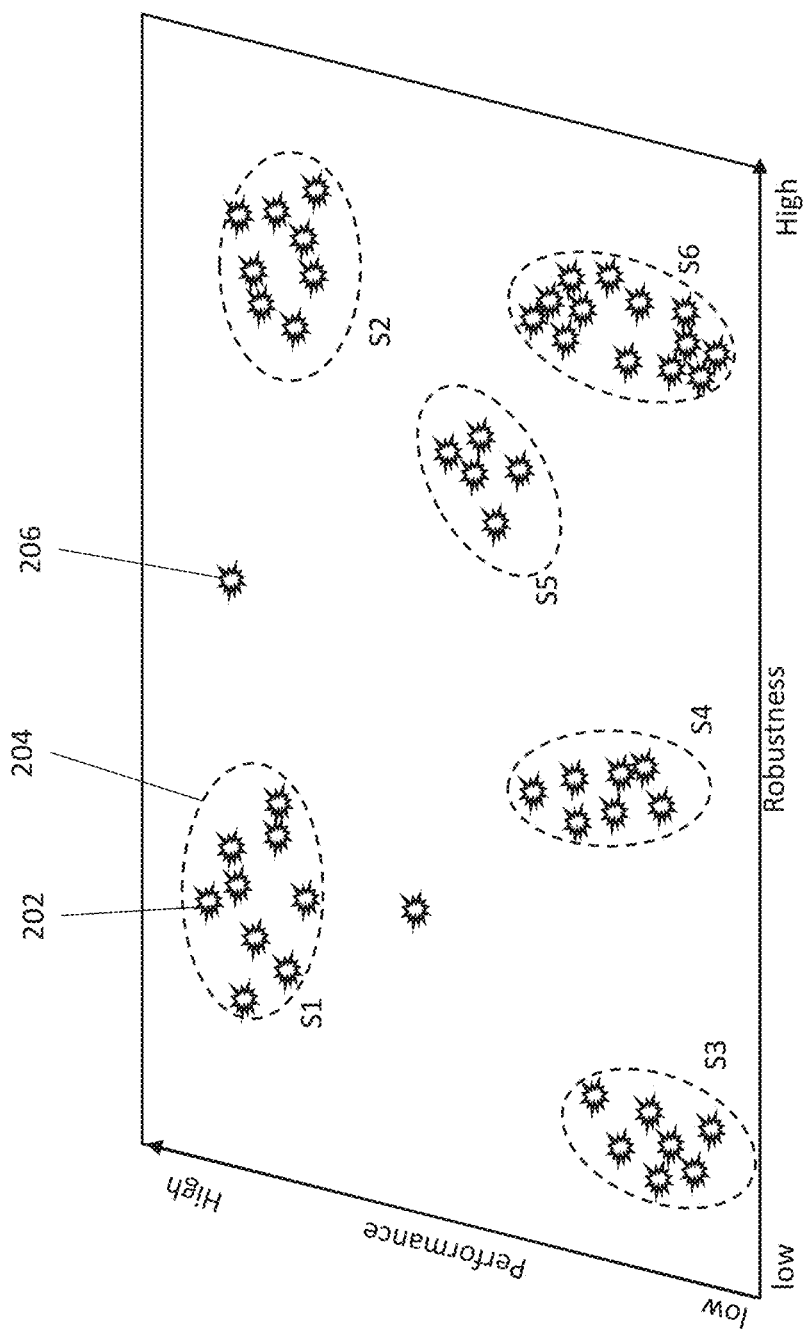
FIG. 2 illustrates a two-dimensional representation of clustered performance/robustness data points according to one or more embodiments of the present invention.

Referring to FIG. 2, an illustration of performance/robustness data points mapped to a two-dimensional coordinate system 200 is shown in accordance with embodiments of the present invention. A first performance/robustness data point 202 is shown as part of a first cluster 204. An outlier data point 206 is further shown outside of any indicated cluster. As illustrated, the six clusters S1, S2, S3, S4, S5, and S6 each include multiple performance/robustness data points 202 and are shown in various positions of the two-dimensional coordinate system 200. Each cluster represents a state of the computing system 112 at a given point in time. The six clusters S1, S2, S3, S4, S5, and S6 are not necessarily numbered in temporal sequence, rather they are numbered for illustration purposes. The axes of the two-dimensional coordinate system 200 include a robustness axis (x-axis) and a performance axis (y-axis). As each axis moves away from the origin, which represents no influence of either performance or robustness, the influence on either performance or robustness increases. For example, the S1 cluster 204 includes nine performance/robustness data points 202 and is located at a position indicating a high performance and a low robustness.

Figure 3A:
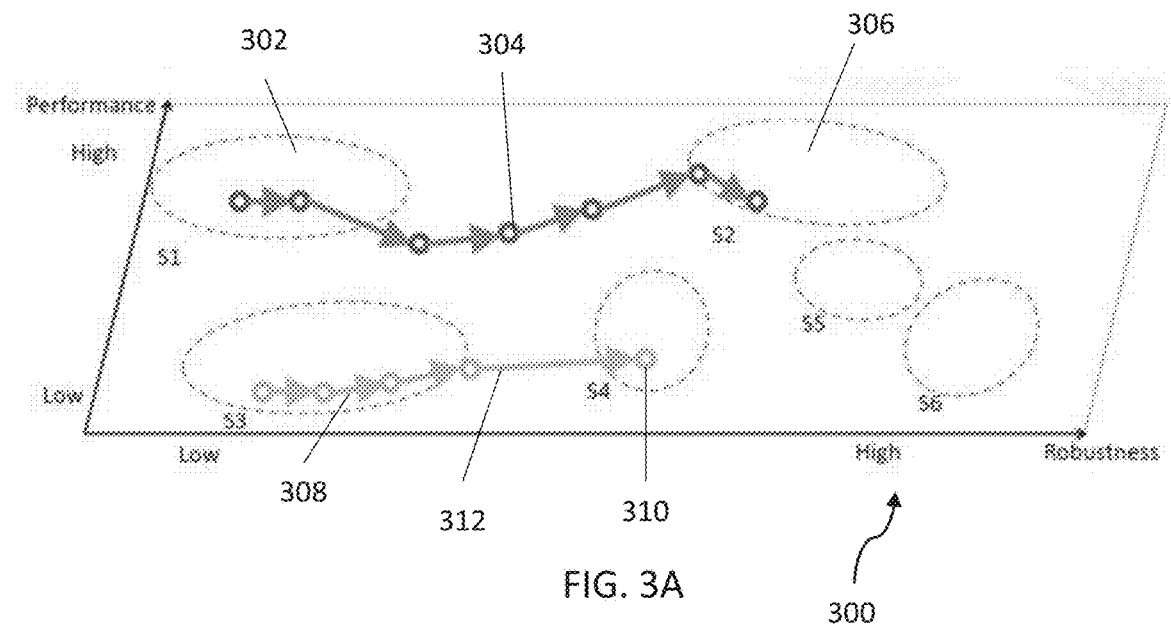
FIG. 3A illustrates a two-dimensional representation of performance/robustness data point clusters and time-based vectors according to one or more embodiments of the present invention.
Figure 3B:
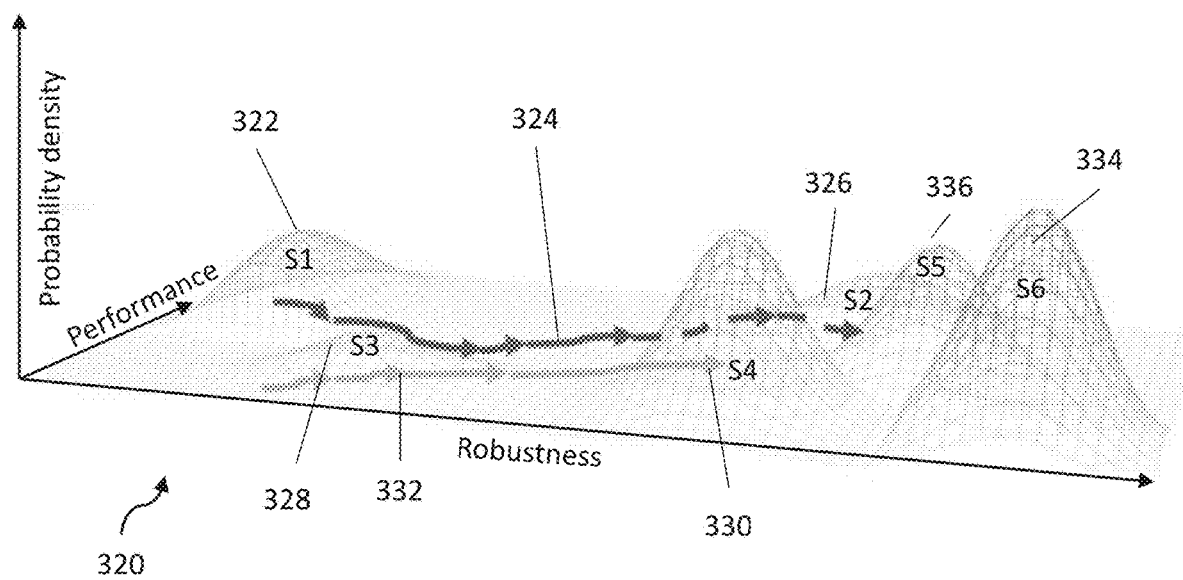
FIG. 3B illustrates a three-dimensional representation of performance/robustness data point clusters and time-based vectors according to one or more embodiments of the present invention.

Referring to FIG. 3A, an illustration of the clusters illustrated in FIG. 2 mapped to a two-dimensional coordinate system 300 is shown in accordance with embodiments of the present invention. As illustrated, a first time-based vector 304 extends from the S1 cluster 302 to the S2 cluster. A second time-based vector 312 extends from the S3 cluster 308 to the S4 cluster 310. Referring to FIG. 3B, an illustration of the clusters illustrated in FIG. 2 mapped to a three-dimensional coordinate system 320 is shown in accordance with embodiments of the present invention. As illustrated, a first time-based vector 324 extends from the S1 cluster 322 to the S2 cluster 326. A second time-based vector 322 extends from the S3 cluster 328 to the S4 cluster 330. The relative height of each three-dimensional structure is based on a probability density of performance/robustness data points of each underlying cluster. As seen, the probability density of performance/robustness data points is greater in the S6 cluster 334 than the S5 cluster 336, therefore the height of the S6 cluster 334 is greater than a height of the S5 cluster 336.

Figure 4:
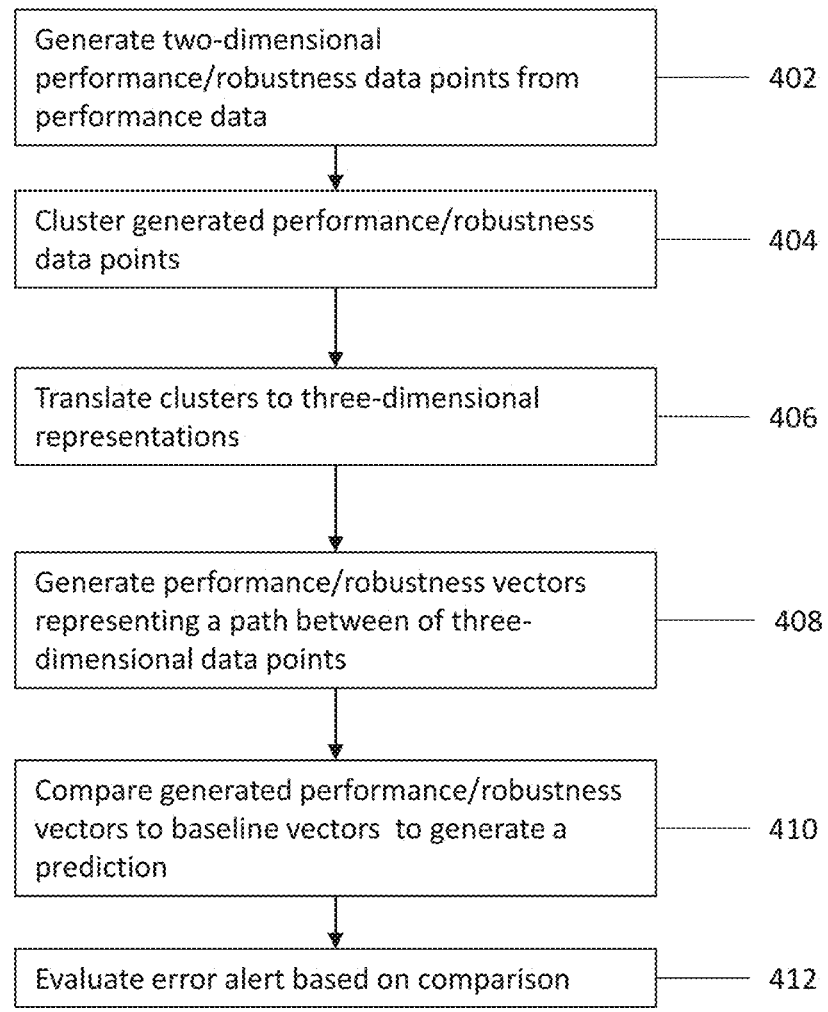
FIG. 4 illustrates a flow diagram for reducing false alerts in a hybrid cloud environment according to one or more embodiments of the present invention.

Referring to FIG. 4, a method 400 for performance analysis to reduce false alerts in a hybrid cloud environment. It should be appreciated that a portion or all of the described method 400 can be performed on the cloud computing environment 50 as described in FIG. 6 and a processing system 800 as described by FIG. 8. At block 402, the data point generation unit 102 can receive system data 110 from a computing system 112 and generate performance/robustness data points. The system data 110 can be entered as inputs for a model executed by a neural network of the data point generation unit 102. The data point generation unit 102 can sample the system data 110 and utilize the model to extract features that are indicative of performance and robustness. The data point generation unit 102 further generates performance/robustness data points for a two-dimensional coordinate system (e.g., Cartesian coordinates).

At block 404, the data point clustering unit 104 clusters the generated performance/robustness data points. Each cluster includes data points indicative of performance and robustness and further represent a state of the computing system 112 at a specific time. Once the clusters are identified, the data point clustering unit 104 determines a state of the computing system 112 represented by an associated cluster based on the positioning of the cluster in the two-dimensional coordinate system. The clustering can be performed by a neural network executing a model, for example, a mean-shift model that iteratively clusters the performance/robustness data points together.

At block 406, the three-dimensional data point translation unit 106 translates the performance/robustness data points from a two-dimensional representation to a three-dimensional representation. The three-dimensional data point translation unit 106 calculates the center of mass for each state (cluster). Then the three-dimensional data point translation unit 106 calculates the probability of each state and uses these probabilities to calculate a probability density for each state. The probability densities include local maxima and minima, and a local elevation of each three-dimensional state is proportional to local maxima and minima.

At block 408, the performance and robustness vector unit 108 generates three-dimensional time-based vectors, which represent a progression of the computing system 112 from one state to a temporally next state. The performance and robustness vector unit 108 analyzes the system data 110 for indicators of temporal relationships between states. For example, the performance and robustness vector unit 108 searches for time-stamp data, conditional statements, a sequential execution statements to determine a temporal order in which the states occurred. The performance and robustness vector unit 108 then compares the three-dimensional trajectories of the generated time-based vectors to trajectories of baseline vectors to generate a prediction 114 at block 410. At block 412, the performance and robustness vector unit 108 evaluates an error alert based on the comparison. Blocks 410 and 412 are described with more specificity with reference to FIG. 5

Figure 5:
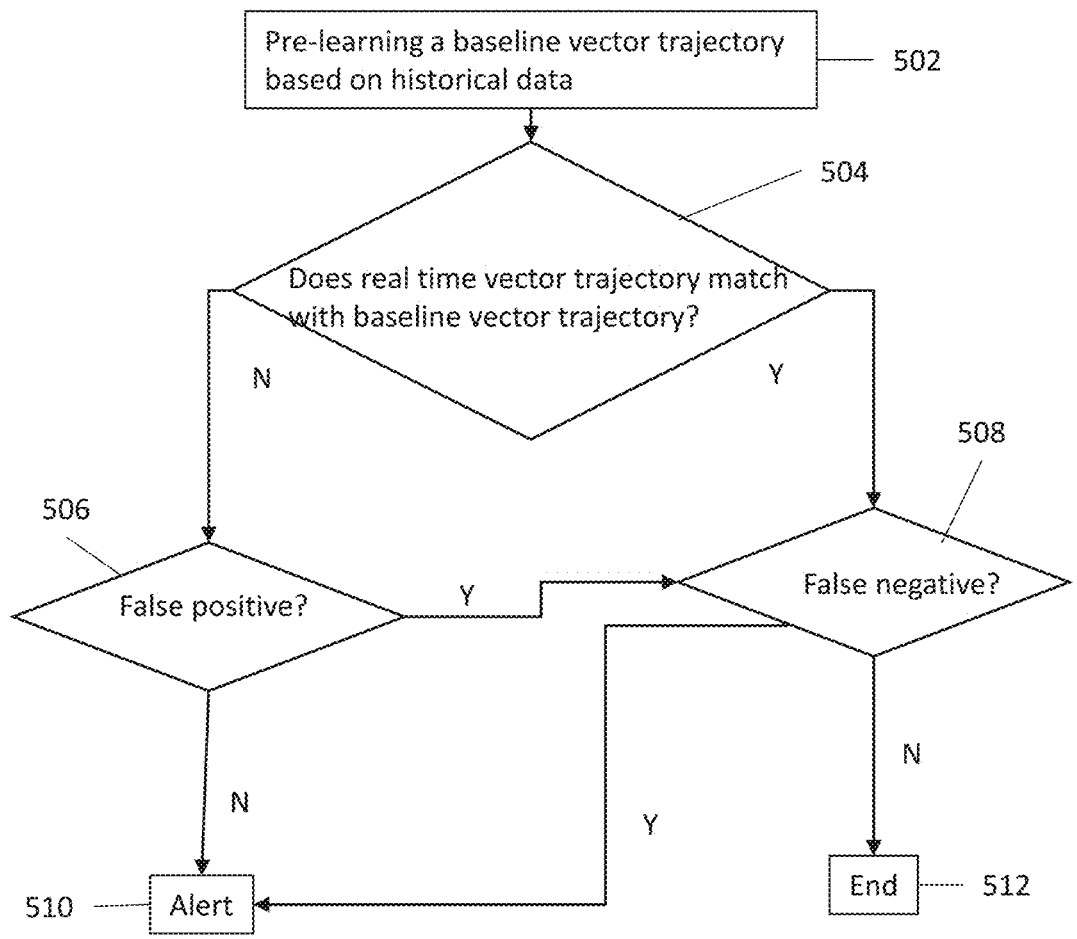
FIG. 5 illustrates a flow diagram for comparing a time-based vector with a baseline vector according to one or more embodiments of the present invention.

With reference to FIG. 5, a method 500 for comparing performance/robustness vectors and evaluating error alerts in accordance with embodiments of the present invention. It should be appreciated that a portion or all of the described method 400 can be performed on the cloud computing environment 50 as described in FIG. 6 and a processing system 800 as described by FIG. 8. At block 502, the performance and robustness vector unit 108 pre-learns a baseline vector by collecting historical data and generating performance/robustness data points from the historical data. The performance and robustness vector unit 108 then generates clusters of two-dimensional clusters of performance/robustness data points. Each cluster represents a state of the computing system 112 at a point in time. The performance and robustness vector unit 108 then translates the two-dimensional clusters to three-dimensional representations based on a probability density of the data points of the clusters. The performance and robustness vector unit 108 then generates time-based baseline vectors describing a transition from one state to a temporally next state of a computing system.

At block 504, the performance and robustness vector unit 108 then compares the trajectories of the generated time-based vectors to trajectories of baseline vectors to determine whether the generated time-based vector and the baseline vector deviate greater than a threshold deviation. For example, the threshold deviation can be a standard deviation based on probability distribution derived from historical data. Therefore, if the deviation is greater than the standard deviation and there is no match, the performance and robustness vector unit 108 proceeds to determine whether is a false positive at block 506.

At block 506, the performance and robustness vector unit 108 proceeds to determine whether it is a false positive by iteratively comparing each leg of the generated time-based vector and each leg of the baseline vector. As the respective first leg of each of the generated time-based vector and the baseline vector is sequentially first in time, the performance and robustness vector unit 108 first analyzes this pair of legs and then proceeds to compare the remaining legs sequentially. If the performance and robustness vector unit 108 determines that a pair of legs deviate greater than a threshold deviation, it determines whether the deviation is based on a result of outlier data. If both the starting data point and the ending data point are associated with a respective cluster, then the performance and robustness vector unit 108 can verify the deviation. If, however, the ending data point of a leg is an outlier data point (e.g., the outlier data point 206 illustrated in FIG. 2), the performance and robustness vector unit 108 further analyzes the deviation. If the ending data point is an outlier data point, the performance and robustness vector unit 108 removes the outlier data point as the ending point and recalculates a new leg of the generated time-based vector without the outlier data point as the ending data point. The performance and robustness vector unit 108 uses the ending data point from the next sequential leg as the new ending data point. In effect, the performance and robustness vector unit 108 removes the outlier data point and collapses two sequential legs of the vector into a single leg. The performance and robustness vector unit 108 then compares the newly generated leg to the leg of the baseline vector to determine whether their trajectories within a threshold deviation.

If at least one leg of the original legs of the generated time-line vector and the baseline vector or the newly generated time-line vector and the baseline vector deviates greater than the threshold deviation, there is no false positive, and the performance and robustness vector unit 108 issues an anomaly alert at block 510. If, however, each leg of the original legs of the generated time-line vector and the baseline vector or the newly generated time-line vector and the baseline vector do not deviate greater than the threshold deviation, the performance and robustness vector unit 108 determines whether there is a false negative at block 508. The performance and robustness vector unit 108 verifies that a state progression of the generated time-based vector matches the baseline vector. For example, if the state progression of the generated time-based vector is state one to state three to state four to state five to state six, then the performance and robustness vector unit 108 verifies that the baseline vector also progresses from state one to state three to state four to state five to state six. If the performance and robustness vector unit 108 determines that comparison does not establish a false negative, then the process ends at block 512. If, however, the performance and robustness vector unit 108 determines that the comparison does not establish a false negative, the performance and robustness vector unit 108 issues an anomaly alert at block 510. The alert can be in the form of a visual icon displayed on a display of a software engineer, software developer, or other appropriate person.

In some embodiments of the present invention, the system 100 is monitoring a component of a hybrid cloud system which includes a private cloud in operable communication with multiple public clouds. For example, the system 100 can monitoring the private cloud, a public cloud, an application, or a combination thereof. The system 100 can further direct that resources are reprovisioned in response to determine that an anomaly alert is not the result of a false positive or false negative. If the performance and robustness vector unit 108 generates an anomaly prediction 114 that performance/robustness data suggests that an anomaly is occurring at one component of the hybrid cloud computing system, it can direct measures to limit service interruptions at other aspects of the cloud computing system. For example, if an anomaly is predicted at the private cloud, the data point generation unit 102 determines whether any of the collected system data 110 relates to an application running on a public cloud or the public cloud itself. The anomaly may suggest an unexpected reduction in available dedicated memory or dedicated processing capability for a public cloud or an application running on the public cloud. In this situation, the performance and robustness vector unit 108 can redirect excess memory or processing capability or unused memory or processing capability dedicated to one or more other public clouds toward the public cloud or application related to the anomaly at the private cloud. In the alternative, an anomaly may be predicted at a public cloud. For example, the performance and robustness vector unit 108 may determine that an anomaly results in a drain on the resources of the private cloud. In this instance, the performance and robustness vector unit 108 could direct the private cloud to redirect more resources to the public cloud, or direct the private cloud or public cloud to cease supporting the application causing the drain. It should be appreciated that other the system 100 could cause other redirections of resources to sustain the core functions of the hybrid cloud computing system.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
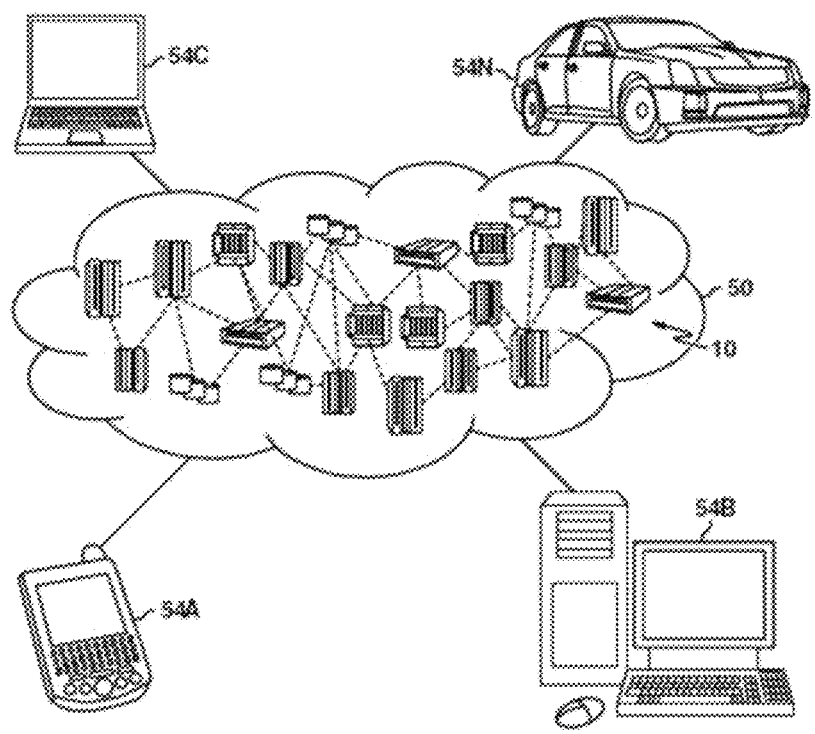
FIG. 6 illustrates a cloud computing environment according to one or more embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
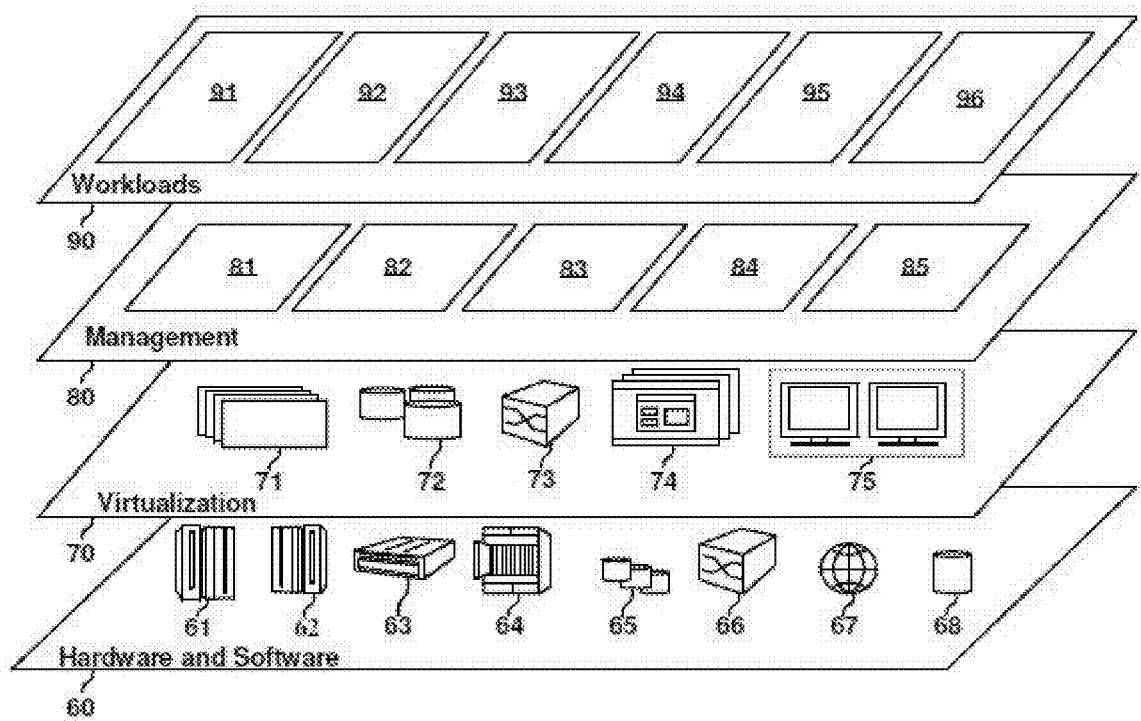
FIG. 7 illustrates abstraction model layers according to one or more embodiments of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtualization 93; data analytics processing 94; transaction processing 95; and performance analysis to reduce false alerts in a hybrid cloud environment 96.

Figure 8:
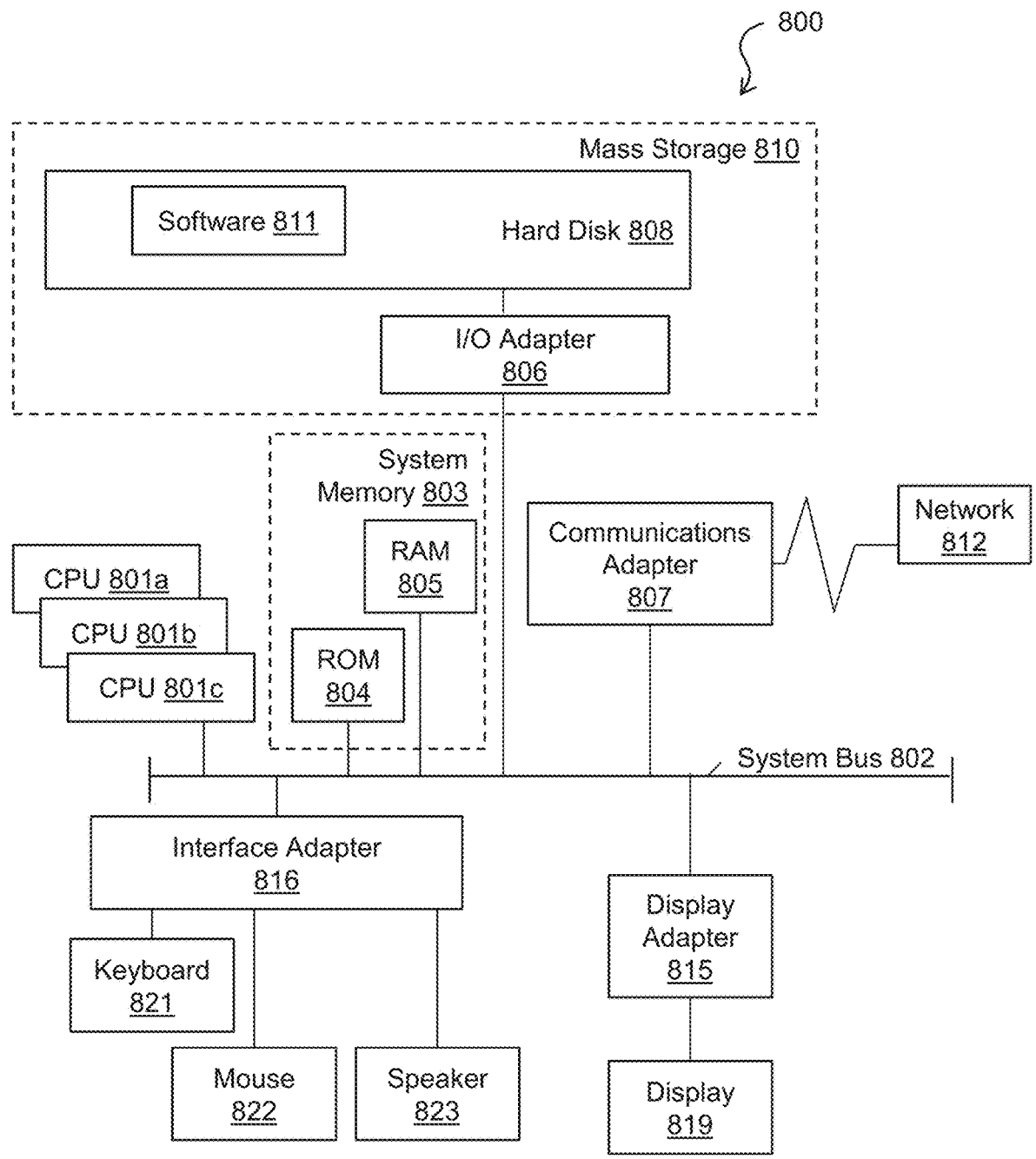
FIG. 8 illustrates a block diagram of a computer system for use in implementing one or more embodiments of the present invention.

In one or more embodiments of the present invention, the hardware/software modules in the system 100 from FIG. 1 can be implemented on the processing system 800 found in FIG. 8. Turning now to FIG. 8, a computer system 800 is generally shown in accordance with an embodiment. The computer system 800 can be an electronic, computer framework comprising and/or employing any number and combination of computing devices and networks utilizing various communication technologies, as described herein. The computer system 800 can be easily scalable, extensible, and modular, with the ability to change to different services or reconfigure some features independently of others. The computer system 800 may be, for example, a server, desktop computer, laptop computer, tablet computer, or smartphone. In some examples, computer system 800 may be a cloud computing node, such as a node 10 of FIG. 6. Computer system 800 may be described in the general context of computer system executable instructions, such as program modules, being executed by a computer system. Generally, program modules may include routines, programs, objects, components, logic, data structures, and so on that perform particular tasks or implement particular abstract data types. Computer system 800 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system 800 has one or more central processing units (CPU(s)) 801*a*, 801*b*, 801*c*, etc. (collectively or generically referred to as processor(s) 801). The processors 801 can be a single-core processor, multi-core processor, computing cluster, or any number of other configurations. The processors 801, also referred to as processing circuits, are coupled via a system bus 802 to a system memory 803 and various other components. The system memory 803 can include a read only memory (ROM) 804 and a random access memory (RAM) 805. The ROM 804 is coupled to the system bus 802 and may include a basic input/output system (BIOS), which controls certain basic functions of the computer system 800. The RAM is read-write memory coupled to the system bus 802 for use by the processors 801. The system memory 803 provides temporary memory space for operations of said instructions during operation. The system memory 803 can include random access memory (RAM), read only memory, flash memory, or any other suitable memory systems.

The computer system 800 comprises an input/output (I/O) adapter 806 and a communications adapter 807 coupled to the system bus 802. The I/O adapter 806 may be a small computer system interface (SCSI) adapter that communicates with a hard disk 808 and/or any other similar component. The I/O adapter 806 and the hard disk 808 are collectively referred to herein as a mass storage 810.

Software 811 for execution on the computer system 800 may be stored in the mass storage 810. The mass storage 810 is an example of a tangible storage medium readable by the processors 801, where the software 811 is stored as instructions for execution by the processors 801 to cause the computer system 800 to operate, such as is described herein below with respect to the various Figures. Examples of computer program product and the execution of such instruction is discussed herein in more detail. The communications adapter 807 interconnects the system bus 802 with a network 812, which may be an outside network, enabling the computer system 800 to communicate with other such systems. In one embodiment, a portion of the system memory 803 and the mass storage 810 collectively store an operating system, which may be any appropriate operating system, such as the z/OS or AIX operating system from IBM Corporation, to coordinate the functions of the various components shown in FIG. 8.

Additional input/output devices are shown as connected to the system bus 802 via a display adapter 815 and an interface adapter 816 and. In one embodiment, the adapters 806, 807, 815, and 816 may be connected to one or more I/O buses that are connected to the system bus 802 via an intermediate bus bridge (not shown). A display 819 (e.g., a screen or a display monitor) is connected to the system bus 802 by a display adapter 815, which may include a graphics controller to improve the performance of graphics intensive applications and a video controller. A keyboard 821, a mouse 822, a speaker 823, etc. can be interconnected to the system bus 802 via the interface adapter 816, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 8, the computer system 800 includes processing capability in the form of the processors 801, and, storage capability including the system memory 803 and the mass storage 810, input means such as the keyboard 821 and the mouse 822, and output capability including the speaker 823 and the display 819.

In some embodiments, the communications adapter 807 can transmit data using any suitable interface or protocol, such as the internet small computer system interface, among others. The network 812 may be a cellular network, a radio network, a wide area network (WAN), a local area network (LAN), or the Internet, among others. An external computing device may connect to the computer system 800 through the network 812. In some examples, an external computing device may be an external webserver or a cloud computing node.

It is to be understood that the block diagram of FIG. 8 is not intended to indicate that the computer system 800 is to include all of the components shown in FIG. 8. Rather, the computer system 800 can include any appropriate fewer or additional components not illustrated in FIG. 8 (e.g., additional memory components, embedded controllers, modules, additional network interfaces, etc.). Further, the embodiments described herein with respect to computer system 800 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
converting, by a processor, runtime data points that are indicative of an influence of the runtime data points on a robustness and performance of a computing system;
clustering, by the processor, the runtime data points, wherein each cluster respectively represents a temporal state of the computing system;
translating, by the processor, each cluster into a three-dimensional representation based on a probability density of the runtime data points of each cluster;
generating, by the processor, a time-based vector describing a transition from a first three-dimensional representation to a second three-dimensional representation, wherein each three-dimensional representation traversed by the time-based vector represents a respective state of the computing system;
comparing, by the processor, the generated time-based vector with a baseline vector; and
issuing, by the processor, an anomaly alert based at least in part on the comparison.

2. The computer-implemented method of claim 1, further comprising:
determining, based at least in part on the comparison, whether a deviation of the time-based vector from the baseline vector is due to a false positive of an anomaly; and
determining, whether a deviation of the time-based vector from the baseline vector is due to a false negative of the anomaly based at least in part on the determination of the false positive.

3. The computer-implemented method of claim 2, wherein determining whether the deviation of the time-based vector from the baseline vector is due to a false positive of the anomaly comprises:
determining whether a starting data point and an ending data point of a first leg of the time-based vector are respectively included in a first cluster and a temporally sequential second cluster; and
comparing a trajectory of the first leg of the time-based vector and a trajectory of first leg of the baseline vector to determine whether the trajectories deviate greater than a threshold deviation.

4. The computer-implemented method of claim 2, wherein determining whether the deviation of the time-based vector from the baseline vector is due to a false negative of the anomaly comprises comparing a sequence of state transitions described by the time-based vector with a sequence of state transitions described by the baseline vector.

5. The computer-implemented method of claim 2, further comprising causing the anomaly alert to be issue based on the determination that the deviation is not indicative of a false positive.

6. The computer-implemented method of claim 2, further comprising causing the anomaly alert to be issue based on the determination of a false negative.

7. The computer-implemented method of claim 1, wherein translating the clusters into three-dimensional representations is based on a probability distribution of the runtime data points of each cluster.

8. A system comprising:
a memory having computer readable instructions; and
one or more processors for executing the computer readable instructions, the computer readable instructions controlling the one or more processors to perform operations comprising:
converting runtime data points that are indicative of an influence of the runtime data points on a robustness and performance of a computing system;
clustering the runtime data points, wherein each cluster respectively represents a temporal state of the computing system;
translating each cluster into a three-dimensional representation based on a probability density of the runtime data points of each cluster;
generating a time-based vector describing a transition from a first three-dimensional representation to a second three-dimensional representation, wherein each three-dimensional representation traversed by the time-based vector represents a respective state of the computing system;
comparing the generated time-based vector with a baseline vector; and
issuing an anomaly alert based at least in part on the comparison.

9. The system of claim 8, the operations further comprising:
determining, based at least in part on the comparison, whether a deviation of the time-based vector from the baseline vector is due to a false positive of the anomaly; and
determining, whether a deviation of the time-based vector from the baseline vector is due to a false negative of the anomaly based at least in part on the determination of the false positive.

10. The system of claim 9, wherein determining whether the deviation of the time-based vector from the baseline vector is due to a false positive of the anomaly comprises:
determining whether a starting data point and an ending data point of a first leg of the time-based vector are respectively included in a first cluster and a temporally sequential second cluster; and
comparing a trajectory of the first leg of the time-based vector and a trajectory of a first leg of the baseline vector to determine whether the trajectories deviate greater than a threshold deviation.

11. The system of claim 9, wherein determining whether the deviation of the time-based vector from the baseline vector is due to a false negative of the anomaly comprises comparing a sequence of state transitions described by the time-based vector with a sequence of state transitions described by the baseline vector.

12. The system of claim 9, further comprising causing an alert to be issue based on the determination that the deviation is not indicative of a false positive.

13. The system of claim 9, further comprising causing an alert to be issue based on the determination of a false negative.

14. The system of claim 8, wherein translating the clusters into three-dimensional representations is based on a probability distribution of the performance/robustness data points of each cluster.

15. A computer program product comprising a computer readable storage medium having program instructions embodied therewith, the program instructions executable by a processor to cause the processor to perform operations comprising:

converting runtime data points that are indicative of an influence of the runtime data points on a robustness and performance of a computing system;

clustering the runtime data points, wherein each cluster respectively represents a temporal state of the computing system;

translating each cluster into a three-dimensional representation based on a probability density of the runtime data points of each cluster;

generating a time-based vector describing a transition from a first three-dimensional representation to a second three-dimensional representation, wherein each three-dimensional representation traversed by the time-based vector represents a respective state of the computing system;

comparing the generated time-based vector with a baseline vector; and issuing an anomaly alert based at least in part on the comparison.

16. The computer program product of claim 15, the operations further comprising:

determining, based at least in part on the comparison, whether a deviation of the time-based vector from the baseline vector is due to a false positive of the anomaly; and determining, whether a deviation of the time-based vector from the baseline vector is due to a false negative of the anomaly based at least in part on the determination of the false positive.

17. The computer program product of claim 16, wherein determining whether the deviation of the time-based vector from the baseline vector is due to a false positive of an anomaly comprises:

determining whether a starting data point and an ending data point of a first leg of the time-based vector are respectively included in a first cluster and a temporally sequential second cluster; and comparing a trajectory of the first leg of the time-based vector and a trajectory of first leg of the baseline vector to determine whether the trajectories deviate greater than a threshold deviation.

18. The computer program product of claim 16, wherein determining whether the deviation of the time-based vector from the baseline vector is due to a false negative of an anomaly comprises comparing a sequence of state transitions described by the time-based vector with a sequence of state transitions described by the baseline vector.

19. The computer program product of claim 16, further comprising causing an alert to be issue based on the determination that the deviation is not indicative of a false positive.

20. The computer program product of claim 15, translating the clusters into three-dimensional representations is based on a probability distribution of the performance/robustness data points of each cluster.

* * * * *